United States Patent [19]

Williams et al.

[11] 4,248,843

[45] Feb. 3, 1981

[54] TREATMENT OF PHOSPHORIC ACID

[75] Inventors: Charles S. Williams; Jacobus J. Gerber, both of Potchefstroom, South Africa

[73] Assignee: Triomf Fertilizer (Proprietary) Ltd., Johannesburg, South Africa

[21] Appl. No.: 946,237

[22] Filed: Sep. 27, 1978

[30] Foreign Application Priority Data

Sep. 29, 1977 [ZA] South Africa ............... 77/5583

[51] Int. Cl.³ .................. C01B 25/16; C01B 15/16; C01B 25/26

[52] U.S. Cl. .................. 423/321 R; 423/315; 71/34

[58] Field of Search ............... 423/304, 314, 315, 316, 423/317, 319, 321 R, 321 S; 71/34

[56] References Cited

U.S. PATENT DOCUMENTS

| | | | |
|---|---|---|---|
| Re. 29,149 | 3/1977 | Young | 423/317 |
| 2,415,797 | 10/1942 | Low | 423/321 R |
| 3,206,282 | 9/1965 | Crawford et al. | 423/321 R |
| 3,403,974 | 10/1968 | Mustian, Jr. | 423/316 |
| 3,453,074 | 7/1969 | Mustian, Jr. | 423/317 |

FOREIGN PATENT DOCUMENTS 1146556  3/1969  United Kingdom ............... 423/321 R

OTHER PUBLICATIONS

Phosphoric Acid, vol. I, Slack et al., 1968, p. 651.

*Primary Examiner*—O. R. Vertiz
*Assistant Examiner*—Gregory A. Heller
*Attorney, Agent, or Firm*—Steele, Gould & Fried

[57] ABSTRACT

A method for the treatment of phosphoric acid containing one or more impurities comprising the ions of at least one of the metals from the group magnesium, iron and aluminium, including the step of heating the acid under such conditions of temperature, pressure, time and concentration as to cause at least some of these impurities, (and in the case where magnesium is the major constituent among such impurities, more than 60% (mass/mass) of such magnesium) to precipitate as a pyrophosphate of the relevant metal ion.

11 Claims, No Drawings

TREATMENT OF PHOSPHORIC ACID

This invention relates to the treatment of phosphoric acid and more particularly the purification thereof.

The commercial preparation of phosphoric acid from phosphate containing rocks invariably suffers from the problem that certain metal ions, notably those of magnesium, iron, and aluminium, are carried over as impurities into the final product. The quantities of such impurities present obviously depend on the specific type of rock employed. Thus, for example, the local Phalaborwa rock is high in magnesium (1.5% MgO) but relatively low in iron (0.4% $Fe_2O_3$) and aluminium (0.2% $Al_2O_3$) while a typical American rock such as for example the Florida rock is usually high in aluminium (1.0% $Al_2O_3$) and iron (1.25% $Fe_2O_3$) and relatively low in magnesium (0.3 MgO). In the rest of this specification the term 'Phalaborwa acid' will be used to denote a phosphoric acid which has been prepared from a typical Phalaborwa phosphate rock, and which acid has the following approximate constitution: MgO—2.5%; $P_2O_5$—54%; CaO—0.3%; $SO_4^{--}$—3.4%; $Fe_2O_3$—0.64%; $Al_2O_3$—0.17%; F—0.30%.

Often the aforesaid impurities are present in such quantities that the percentage sum of the MgO, $Fe_2O_3$ and $Al_2O_3$ content in the final unpurified 54% product acid exceeds 4%. On an average this figure can vary between 0.5 and 10.0 percent.

For various reasons the presence of such impurities is unwanted. Thus for example, precipitates may form in the acid on storage or during transportation, especially at low temperatures experienced in winter in many parts of the world. The precipitates consist of poorly defined Al—Fe—F—Mg—$PO_4$ compounds usually settling out slowly over a period of weeks or even months, making it impracticable to utilize ths behaviour of the impurities in the acid as a means of purifying the acid before despatch. The presence of these impurities in the acid may also give rise to various problems when the phosphoric acid is being used in the production of fertilizers. Acids high in magnesium, for example, tend to form gel-like products when the acid is ammoniated, presumably through the formation of insoluble Mg—$NH_4$—$PO_4$ compounds, such products being unsuitable for liquid fertilizer applications, for example, causing serious handling problems. Furthermore, the addition of the ammonium ion on ammoniation of the acid drastically increases the possibility of precipitation of unwanted insoluble compounds containing Al—Fe—Mg—$NH_4$—F—$PO_4$ complexes of widely different compositions and properties, depending on the origin and treatment of a particular wet-process acid.

As a result of these disadvantages, strict requirements have been laid down as regards the permissable percentage of such impurities, the specifications being determined by the type of acid in question and the eventual application of the acid. In the case of magnesium, for example, it is usually required that 70% $P_2O_5$ phosphoric acid should not contain more than 0.5% MgO. Furthermore, acids with low $R_2O_3$ values R = sum of $Al_2O_3$ and $Fe_2O_3$ percentages), say below 2%, are preferred to those with high iron and aluminium content.

Various attempts have been made to remove such impurities from wet-process phosphoric acid but the hitherto suggested solutions all suffer from some disadvantage or another. Since there is a gradual decline in quality of phosphate rock being processed in the world it is expected that the need for economically feasible purification processes of wet-process phosphoric acid will increase considerably in the future in order to provide acid of acceptable quality for the production of high concentration fertilizers.

The following is a brief summary of some of the processes presently available to the fertilizer industry for the purification of phosphoric acid.

(i) SOLVENT EXTRACTION

Several processes, based on the extraction of inorganic impurities from the acid with an organic solvent, have been developed and some are being used industrially. Phosphoric acid of suitable quality can thus be obtained, but the process is expensive. Thus, for example, the costs of effecting the necessary modification to an existing average sized phosphoric acid plant could run into several million rand with the result that purification costs will be in the order of 30–40 dollars per ton $P_2O_5$, depending on solvent losses and phosphate losses in the raffinate.

(ii) SOLVENT PRECIPITATION

Here, for example, the acid is mixed with a miscible solvent such as methanol to cause impurities to precipitate as phosphate salts. Often small quantities of inorganic salts are added, such as ammonia, to enhance the formation of insoluble species. The solids are separated and the solvent distilled from the liquid phase and recyled, leaving purified acid as residue. This is also an expensive process with high energy requirements. For example, in one such process 3.5 Kg. of methanol and 0.04 Kg. ammonia is required per kilogram $P_2O_5$. P losses in the solids occur and are of the order of 10% of input $P_2O_5$.

(iii) INDIRECT PURIFICATION

In this type of process the phosphate in the acid is separated from the impurities as a salt or an organic addition compound which is converted into the required end-product. In one such process Urea-phosphate is precipitated from 54% $P_2O_5$ acid. The urea-phosphate crystals are then separated from the mother liquor by centrifuging, and decomposed at 121+°C. to form a melt of ammonium polyphosphate and undecomposed urea. Ammonia and water can be added to this mixture to prepare a 15-28-0 fertilizer solution, containing 85%, for example, of the original phosphate but only 15% of the original impurities. The mother liquor obtained from the centrifugal separation can be processed into some suspension fertilizer. To recover phosphoric acid from the urea-phosphate, treatment with nitric acid is necessary to precipitate urea-nitrate. The latter which can be neutralized with ammonia to form urea ammonium nitrate solution. As will be appreciated, this procedure is rather laborious and hence time consuming and expensive.

(iv) ION EXCHANGE

Here again the dissolved impurities in the acid can be absorbed on an ion exchange resin from diluted acid, say 30% $P_2O_5$, and removed from the resin with another acid such as sulphuric acid. This method produces a high quality acid, but apart from the cost aspect, several problems make this method unattractive, such as poisoning of the resin, precipitation of solids from the acid on the resin and difficulty of clarifying the acid beforehand sufficiently not to block the exchange column with gypsum and other insoluble residues.

In contrast to these involved and hence expensive and time consuming existing processes, it is an object of the present invention to provide a simple yet efficient method for the treatment of phosphoric acid whereby impurities such as for example magnesium may be removed from it.

According to the invention a method for the treatment of phosphoric acid containing one or more impurities comprising the ions of at least one of the metals from the group magnesium, iron and aluminium, includes the step of heating the acid under such conditions of temperature, pressure, time and concentration as to cause at least some of these impurities, (and in the case where magnesium is the major constituent among such impurities, more than 60% (mass/mass) of such magnesium) to precipitate as a pyrophosphate of the relevant metal ion.

Applicant has for example found that if Phalaborwa acid is heated above room temperature, and notably above 100° C., a precipitate is formed after a period of time which contains more than 63% (mass/mass) of the magnesium as the acid magnesium pyrophosphate $MgH_2P_2O_7 \cdot xH_2O$.

Further according to the invention the method includes the step, in the case of an acid containing magnesium as the major impurity, of precipitating at least 70% (mass/mass) of the magnesium as acid magnesium pyrophosphate.

In one form of the invention the method may include the step of seeding the acid with the acid pyrophosphate of the relevant metal ion in order to induce the formation of the precipitate.

The inducing agent may for example comprise some of the precipitate which has been formed in a prior precipitation by heating of the acid while in another form of the invention it may comprise the synthetic equivalent of such a precipitate.

In another form of the invention the precipitation may be induced by heating the acid under elevated pressure.

Applicant has for example found that by merely heating the acid under pressure the magnesium content of the acid can be reduced to below the specified value of 0.5% MgO at 70% $P_2O_5$ concentration in a relatively short time.

Applicant has furthermore found that the magnesium acid pyrophosphate precipitate so obtained has superior filtering properties and crystallinity in comparison with the magnesium acid pyrophosphate precipitates obtained when precipitation is effected at atmospheric pressure.

Applicant has also found that the rate of formation of the metal ion acid pyrophosphate precipitate increases with increased temperature and pressure. Thus, for example, applicant has found a temperature range in the order of 100° C.+ suitable although good results were also obtained at as high as 180° C. Further, pressures above atmospheric pressure, but notably about 100 p.s.i., and preferably 300–500 p.s.i., increased precipitation rates considerably.

Applicant has found that the wet-process phosphoric acid prepared from Phalaborwa rock purified with the methods described above, has certain properties of important commercial value, notably low viscosity, high clarity, low overall impurity content (i.e. percentages $MgO+Al_2O_3+Fe_2O_3$ as low as even 1.5%), very low fluorine content (0.05%) and normal behaviour with respect to the conversion of ortho-phosphate to poly-phosphates.

Much fewer handling problems will accordingly be encountered with such purified acid than what usually the case is with other commercially available phosphoric acids.

Further according to the invention the method includes the step of treating the precipitate with a neutralising agent, such as calcium carbonate, calcium hydroxide, sodium hydroxide, ammonia etc.

In this manner a high quality slow release fertilizer ($P_2O_5$ approximately 60%) may be produced which is not hygroscopic and which appears to possess good granulation properties.

The invention will now be further described by way of example with reference to the following experiments which were conducted for the removal of magnesium from wet-process phosphoric acid obtained from the Applicant's Phosphoric acid plant at Potchefstroom, Transvaal, and produced from phosphate rock mined by Fosfor at Phalaborwa in the Northern Transvaal.

I. A first series of experiments were conducted in order to establish and illustrate the effect of temperature, concentration and seeding with magnesium acid pyrophosphate in the removal of magnesium from Phalaborwa Phosphoric acid as magnesium acid pyrophosphate precipitate under atmospheric pressure. In these experiments 800 gram quantities of the acid drawn from the same stock solution were heated in glass beakers in an oven. Samples were removed periodically to follow the course of the precipitation reaction. The results are reflected in table I in which only details regarded as relevant to illustrate the factors indicated above are included.

In table I "seeded" means seeded with 1% by mass of magnesium acid pyrophosphate precipitate obtained from a previous precipitation. Also, for the experiments, acids of different concentrations were obtained by concentrating the plant acid under vacuum at approx. 60 mm. Hg pressure to the starting concentrations as indicated in the table viz. 56.1 60.4, 64.2 and 69.1% $P_2O_5$.

The results in table I indicate that magnesium can be precipitated to a value below 0.5% MgO, even at 100° C., provided the acid is seeded with magnesium acid pyrophosphate and sufficient time is allowed, while on the other hand at high temperatures and concentrations the precipitation proceeds faster and can be completed in 24 hours, the seeding with magnesium acid pyrophosphate being a prerequisite to reduce the MgO content of the acid below 0.5%. At temperatures above 160° C. it was found in some cases that the MgO content can be reduced to below 0.5% without seeding the acid, but the products were difficult to filter due to poor crystallinity of the precipitate and the reproducibility was poor.

Some iron and aluminium were found in the magnesium pyrophosphate precipitate and Applicant believes that the reason why not more of these impurities co-precipitated with the magnesium was due to the presence of sulphate ions in the acid.

II. A further experiment was conducted to establish and illustrate the effect of pressure on the rate of magnesium removal from phosphoric acid by the method according to the invention. In this experiment one liter of a previously concentrated phosphoric acid (70.3% $P_2O_5$, 3.04% MgO) was introduced into a pressure container, heated to 150° C. and subjected to a pressure of 300 p.s.i. using compressed air. After one and a half hours the pressure was released and the product filtered immediately under suction through a Buchner funnel fitted with a polypropylene filtering cloth, filtering area 255 sq. cms. The filtering operation was completed in 50 seconds. The acid filtrate analysed to 71.2% $P_2O_5$; 0.38% MgO and the filter cake represented 19 percent of the sample.

A second one liter portion of the concentrated acid was seeded with acid pyrophosphate and heated in an oven at 150° C. under atmospheric pressure. Precipitation started fairly soon, i.e. after approximately 3 hours, but the magnesium content of the acid was below the specified 0.5% MgO only after 20 hours. It took three minutes to filter the product through the Buchner funnel. The filtrate analysed as follows: 69.2% $P_2O_5$; 0.48% MgO, and the filter cake represented 24% of the product mixture.

From these results it is clear that the rate of formation of the magnesium acid pyrophosphate precipitate from the acid is significantly increased by applying an external pressure on the acid while it is being heated at the chosen temperature. This observation applies to seeded and unseeded acid. This is of great significance in cases where this method will be used on commercial scale for acid purification since reduced reaction times mean smaller reactors. Furthermore, the precipitates thus formed have a coarse crystalline appearance with excellent filtering properties, considerably better than those of precipitates formed under atmospheric pressure.

It was further found that significant improvement in precipitation rates of the magnesium acid pyrophosphate is possible at pressures above 100 p.s.i. with 350 p.s.i. the highest pressure being tested. It is however believed that higher pressures can only improve precipitation rates further. Temperatures above 120° C. are preferred with 150°–180° as optimum, although higher temperatures could not be reached with the available equipment. It is however believed that higher temperatures, probably above 200° C., may lead to excessive polyphosphate formation in the acid resulting in increased sequestering of the metal ions in the acid, including magnesium, thereby preventing or limiting the formation of the insoluble magnesium acid pyrophosphate precipitate. With respect to the effect of acid concentration on magnesium precipitation under pressure, it was established that a concentration of approximately 63% $P_2O_5$ was the lowest concentration at which the application of pressure in the range 100–300 p.s.i. has a beneficial effect on the purification of the Phalaborwa acid used. It may well be that at other temperatures and pressures an acid of $P_2O_5$ concentration lower than 63% may also benefit from this method.

III. A further series of experiments were carried out in order to evaluate the method when applied on a much larger scale.

In these experiments a brick-lined tank of approximately 6,000 liter capacity, fitted with level control, thermo-couple, heating coils of HV-9 alloy, and agitator was used. The tank was filled with production acid (50.2% $P_2O_5$) from applicant's phosphoric acid plant at Potchefstroom, and the temperature of the acid regulated with the steam flow and kept between 135°–145° C., while the acid was agitated. The first part of the test has as objective only to concentrate the acid under atmospheric conditions to a level where seeding of the acid will induce precipitation. The acid level in the tank was kept constant by introducing fresh acid to make up for evaporation losses. Samples were taken from the acid periodically to follow the progress of the process. The results are reflected in accompanying table II which again contains only a summary of essential figures obtained to illustrate the result of the test. The acid reached a concentration of 62.6% $P_2O_5$ only after 50 hours. The acid was then seeded with 20 liter of magnesium acid pyrophosphate precipitate prepared beforehand in the laboratory, i.e. about 0.35% by mass of the acid in the tank. Precipitation started 5 hours later and the acid reached a level of 0.38% MgO after another 10 hours. The precipitation stopped at a MgO level of approximately 0.3% MgO. Very little or no iron and aluminum was removed from the acid which Applicant suspects was for the same reason stated before. The precipitate obtained under these conditions filtered well and produced a filtrate/filter cake split of 78/22 percent.

Applicant has found that the Phalaborwa rock phoshoric acid purified with the method according to the invention possesses the following properties which make it a superior acid as regards to quality compared to most other commercial wet-process super phosphoric acids on the world market.

(i) VISCOSITY

The viscosities of superphosphoric acids can be extremely high, thereby presenting serious handling problems; solidification occur at room temperature. The removal of magnesium has a pronounced effect on the viscosity of the Phalaborwa rock superphosphoric acid. For example, an acid sample from the phosphoric acid plant was concentrated to 69.1% $P_2O_5$ and 2.8% MgO, and the viscosity measured with a Brookfield viscometer as 2 650 centipoise at 40° C. The same acid sample was then treated with magnesium acid pyrophosphate from a previous experiment and heated at 140° for 24 hours. The filtrate was separated and analysed to 68.8% $P_2O_5$ and 0.36% MgO with a viscosity of 236 centipoise at 40° C.

It is known that a high aluminium content of a phosphoric acid result in a high viscosity of the acid. The exceptionally low viscosity of the South African acid is thus explained. With the magnesium removed from the acid and the exceptionally low aluminium content of the acid (0.1–0.2%) as compared to overseas acids a very low viscosity results thereby producing an acid with good handling properties. After purification an acid is provided with very low residual impurity content.

A superphosphoric acid can be produced with the sum of the MgO, $Fe_2O_3$ and $Al_2O_3$ content below 1.5%, which are very low according to world standards. A 70% $P_2O_5$ superphosphoric acid manufactured from Phalaborwa rock and purified, may then have the following composition: 70% $P_2O_5$; 0.4% MgO; 0.2% $Al_2O_3$; 0.8% $Fe_2O_3$ and 0.05% F.

(ii) CLARITY

Although the commercially available Phalaborwa acid usually darkens to an amber colour when it is concentrated and purified, it is still much more attractive in appearance than acids produced from phosphate rock from organic origin such as the Floride acids of the U.S.A. With the latter acids foaming is a serious problem during concentration, while the Phalaborwa acid with its low carbon content does not require any antifoam agents when it is concentrated to the superphosphoric acid range. A carbon analysis on the Phalaborwa acid of 54% $P_2O_5$ showed only 0.001% carbon, while a comparable Florida, U.S.A. acid contained 0.25% carbon. Applicant has found that the method according to the invention does not adversely affect any of these properties of the Phalaborwa acid.

(iii) POLYPHOSPHATES

Since the polyphosphate content of superphosphoric acids is often specified, it is necessary to indicate what the behaviour of acid purified according to our methods is towards the formation of polyphosphates, i.e. conversion of ortho-phosphate to polyphosphates under heat treatment.

The phosphate in wet-process phosphoric acid is normally present as the ortho-phosphate, but when the acid is being concentrated to the superphosphoric acid range the phosphate may polymerize to form polyphosphates of various composition and distribution, depending on factors such as conditions under which the polymerization has been accomplished and origin, i.e. composition of the acid involved. Applicant's interest in polyphosphates stems from the fact that polyphosphates have the ability to sequester cations such as calcium, magnesium, iron and aluminium, thereby preventing the formation of unwanted insoluble sediments in the acid. It also plays a role in determining the properties of fertilizer end products manufactured from the superphosphoric acid—mostly in a benefical way, improving desired physical properties of the product. It will suffice to state that end users of superphosphoric acid usually stipulate a polyphosphate content (or phosphate in the non-ortho state) of 25-40%, and in certain cases even higher.

The following example will indicate that the acid purified according to the described methods can be treated to produce an acid with any specified polyphosphate content. 1 Liter of an acid, purified by subjecting a concentrated plant acid sample to a pressure of 300 p.s.i. for 1½ hours at 150° C., composition 67.1% $P_2O_5$, 0.32% MgO; 0.2$Al_2O_3$, and 0.72% $Fe_2O_3$, was concentrated further under a pressure of approximately 60 mm. Hg absolute, and samples withdrawn periodically and analysed for total and ortophosphate. With each withdrawal of sample the boiling temperature of the acid was noted. The results are given in table III.

In a further experiment conducted to illustrate the preparation of a magnesium pyrophosphate fertilizer by the method according to the invention, 1 Kg. of a magnesiumm acid pyrophosphate filter cake, obtained by the method according to the invention as described above, with 67% $P_2O_5$ and 11.4% MgO was mixed thoroughly with 300 gram of finely powdered limestone. The final product was a white powder, non-hygroscopic, without any free acid and analysing as follows:

60.1% Total $P_2O_5$; 49.0% Citric Acid soluble $P_2O_5$; 15.1% Water soluble $P_2O_5$; 10.1 MgO; 14.3% CaO; pH=3,6.

The final product remained free-flowing, even after exposure to the atmosphere for several months. The material form had lumps when being moistured with a small amount of water and dried afterwards. It is believed that the material thus obtained has good granulation properties. The analyses of this product suggest that it will be suitable for use as a slow release phosphate fertilizer in the agricultural industry, supplying also the plant nutrients calcium and magnesium.

It will be appreciated that also intended for inclusion with the scope of the invention is phosphoric acid purified by the method according to the invention as well as a fertilizer produced by the method according to the invention.

It will be still further appreciated that although the examples described above were concerned with the removal of Magnesium only from the acid being treated, the invention is not intended to be restricted to the removal of magnesium only.

TABLE I.

| Experiment No. | Reaction Temp. °C. | Reaction Time (hrs) | Acid Conc. (%$P_2O_5$); unseeded | Acid Conc. (%$P_2O_5$); seeded | MgO Content, % unseeded acid | MgO Content, % seeded acid |
|---|---|---|---|---|---|---|
| 1 | 100 | 0 | 56,1 | 56,1 | 2,42 | 2,46 |
|  |  | 100 | 64,3 | 64,0 | 2,63 | 2,20 |
|  |  | 240 | 66,8 | 66,4 | 0,91 | 0,70 |
| 2 | 100 | 0 | 60,4 | 60,4 | 2,71 | 2,74 |
|  |  | 100 | 65,2 | 65,0 | 2,51 | 1,72 |
|  |  | 240 | 66,9 | 67,7 | 0,87 | 0,64 |
| 3 | 100 | 0 | 64,2 | 64,2 | 2,85 | 2,89 |
|  |  | 100 | 66,9 | 66,7 | 1,73 | 1,02 |
|  |  | 240 | 67,8 | 67,9 | 1,01 | 0,65 |
| 4 | 100 | 0 | 69,1 | 69,1 | 3,10 | 3,17 |
|  |  | 100 | 69,9 | 69,6 | 1,41 | 0,85 |
|  |  | 240 | 70,2 | 70,0 | 0,79 | 0,45 |
| 5 | 125 | 0 | 60,4 | 60,4 | 2,71 | 2,74 |
|  |  | 50 | 67,0 | 66,7 | 2,01 | 0,49 |
|  |  | 120 | 67,9 | 70,8 | 0,88 | 0,26 |
| 6 | 125 | 0 | 64,2 | 64,2 | 2,85 | 2,88 |
|  |  | 50 | 68,9 | 68,4 | 1,01 | 0,34 |
|  |  | 120 | 70,9 | 70,8 | 0,80 | 0,26 |
| 7 | 125 | 0 | 69,1 | 69,1 | 3,10 | 3,14 |
|  |  | 20 | 69,8 | 68,1 | 1,90 | 0,47 |
|  |  | 40 | 70,1 | 69,5 | 0,78 | 0,29 |
| 8 | 145 | 0 | 60,4 | 60,4 | 2,85 | 2,88 |
|  |  | 20 | 66,1 | 66,7 | 1,95 | 1,26 |
|  |  | 40 | 68,9 | 68,6 | 1,18 | 0,42 |
| 9 | 145 | 0 | 64,2 | 64,2 | 2,85 | 2,87 |
|  |  | 20 | 67,8 | 67,3 | 1,51 | 0,63 |
|  |  | 40 | 69,9 | 69,7 | 0,87 | 0,24 |
| 10 | 145 | 0 | 69,1 | 69,1 | 3,10 | 3,14 |
|  |  | 20 | 70,6 | 68,6 | 1,25 | 0,42 |

TABLE I.-continued

| Experiment No. | Reaction Temp. °C. | Reaction Time (hrs) | Acid Conc. (%$P_2O_5$); unseeded | Acid Conc. (%$P_2O_5$); seeded | MgO Content, % unseeded acid | MgO Content, % seeded acid |
|---|---|---|---|---|---|---|
| | | 40 | 71,3 | 70,2 | 0,81 | 0,25 |

TABLE II

| Running Time (hrs) | Acid Temp. °C. | %$P_2O_5$ Acid | %MgO Acid | %$Fe_2O_3$ Acid | %$Al_2O_3$ Acid |
|---|---|---|---|---|---|
| 0 | — | 50,2 | 2,21 | 0,68 | 0,17 |
| 10 | 138 | 55,3 | 2,45 | — | — |
| 20 | 142 | 57,9 | 2,54 | — | — |
| 30 | 140 | 58,2 | 2,60 | — | — |
| 40 | 139 | 60,4 | 2,64 | — | — |
| 50* | 141 | 62,6 | 2,76 | — | — |
| 60 | 144 | 62,5 | 2,01 | 0,85 | 0,21 |
| 62 | 144 | 61,9 | 1,50 | — | — |
| 64 | 140 | 62,2 | 0,63 | — | — |
| 66 | 137 | 62,8 | 0,38 | — | — |
| 68 | 142 | 63,2 | 0,32 | — | — |
| 70 | 138 | 63,9 | 0,31 | 0,84 | 0,16 |

*Acid seeded with pyrophosphate

TABLE III

| Sample No. | Boiling Temp. °C. | % Total $P_2O_5$ | % Ortho $P_2O_5$ | % Conversion to Polyphosphate |
|---|---|---|---|---|
| 1 | — | 67,1 | 63,5 | 5,4 |
| 2 | 150 | 67,4 | 62,5 | 7,2 |
| 3 | 160 | 68,0 | 59,8 | 12,1 |
| 4 | 166 | 68,2 | 56,4 | 17,3 |
| 5 | 173 | 68,6 | 53,2 | 22,4 |
| 6 | 179 | 69,0 | 50,4 | 26,9 |
| 7 | 186 | 69,3 | 46,7 | 32,6 |
| 8 | 188 | 69,9 | 45,2 | 35,4 |
| 9 | 193 | 70,4 | 42,1 | 40,2 |
| 10 | 200 | 70,8 | 38,9 | 45,1 |
| 11 | 206 | 71,4 | 35,2 | 50,7 |
| 12 | 212 | 71,7 | 32,7 | 54,4 |
| 13 | 219 | 72,5 | 29,1 | 59,9 |
| 14 | 224 | 72,7 | 26,0 | 64,2 |
| 15 | 230 | 73,0 | 23,7 | 67,6 |
| 16 | 233 | 73,5 | 21,6 | 70,6 |
| 17 | 241 | 75,0 | 18,8 | 74,9 |

We claim:

1. A method for treatment of phosphoric acid having a concentration of from about 50 to about 72% $P_2O_5$, and containing magnesium ions in solution as an impurity comprising heating the acid at a pressure between about 100 and about 500 p.s.i. to a temperature of from about 100° C. to about 180° C. and maintaining the acid at this temperature and pressure to cause more than 60% (mass/mass) of the magnesium to precipitate as the acid pyrophosphate.

2. The method of claim 1 wherein the acid is heated to a temperature from about 100° C. to about 180° C. and maintained at this temperature with the precipitation is completed.

3. The method of claim 1 wherein the formation of the precipitate is induced by seeding the acid with magnesium acid pyrophosphate.

4. The method of claim 3 wherein the magnesium acid pyrophosphate comprises some of the precipitate which has been formed in a prior precipitation obtained by heating the acid.

5. The method of claim 1 wherein the acid is heated under a pressure in the range 300 p.s.i. to 500 p.s.i.

6. The method of claim 1 wherein the acid which had been seeded with magnesium acid pyrophosphate is heated to a temperature in the range 100° C. to 145° C. and maintained at this temperature until such an amount of magnesium acid phyrophosphate has been precipitated that the magnesium remaining in solution in the acid, measured as MgO, is less than 0.5% (mass/mass).

7. The method of claim 1 wherein the acid is concentrated until it contains approximately 70% P205 and then heated for approximately 1½ hours under a pressure on the order of 300 p.s.i. at a temperature on the order of 150° C. to form the magnesium acid pyrophosphate precipitate.

8. The method of claim 1 further comprising the steps of: heating the acid to a temperature on the order of 135° C. to 145° C. until the concentration thereof is on the order of 62% P205; seeding the acid with magnesium acid pyrophosphate; and, maintaining the acid at the temperature for a further period until precipitation of the magnesium acid pyrophosphate had been completed.

9. The method of claim 1 wherein the acid contains less than 1% (mass/mass) in total of aluminum, as A1203, and iron, as Fe203.

10. The method of claim 1 wherein the acid is Phalaborwa acid of the composition 2.5% MgO, 54% $P_2O_5$, 0.003% CaO, 3.4% $SO_4$, 0.64% $Fe_2O_3$, 0.17% $Al_2O_3$, and 0.3% F.

11. The method of claim 1 further comprising the step of treating the precipitate with a neutralizing agent, selected from the group consisting of calcium carbonate, calcium hydroxide, sodium hydroxide, and ammonia to produce a fertilizer compound.

* * * * *

UNITED STATES PATENT AND TRADEMARK OFFICE
CERTIFICATE OF CORRECTION

PATENT NO. : 4,248,843
DATED : February 3, 1981
INVENTOR(S) : WILLIAMS, et al.

It is certified that error appears in the above-identified patent and that said Letters Patent are hereby corrected as shown below:

In the Specification, at column 1, line 37, "ths" should be --this--.

In the Claims, at column 10, line 9 (Claim 2, line 3), "with" should be --until--.

Signed and Sealed this

Fourteenth Day of July 1981

[SEAL]

Attest:

Attesting Officer

GERALD J. MOSSINGHOFF

Commissioner of Patents and Trademarks